US012691739B2

(12) United States Patent
Cai et al.

(10) Patent No.:   US 12,691,739 B2
(45) Date of Patent:     Jul. 28, 2026

(54) WATERPROOF VEHICLE COVER

(71) Applicant: Wenzhou Tianmao Automobile Parts Co., Ltd, Wenzhou City (CN)

(72) Inventors: Lanhua Cai, Wenzhou City (CN); Xianzu Chen, Wenzhou City (CN)

(73) Assignee: Wenzhou Tianmao Automobile Parts Co., Ltd, Wenzhou City (CN)

( * ) Notice: Subject to any disclaimer, the term of this patent is extended or adjusted under 35 U.S.C. 154(b) by 778 days.

(21) Appl. No.: 18/082,953

(22) Filed: Dec. 16, 2022

(65) Prior Publication Data

US 2024/0198772 A1      Jun. 20, 2024

(51) Int. Cl.
B60J 7/16            (2006.01)

(52) U.S. Cl.
CPC .................................. B60J 7/1607 (2013.01)

(58) Field of Classification Search
CPC ... B60J 7/141; B60J 7/16; B60J 7/1607; B60J 7/198

USPC ........... 296/100.02, 100.04, 100.07, 100.08, 296/100.09
See application file for complete search history.

(56)                References Cited

U.S. PATENT DOCUMENTS

| | | | |
|---|---|---|---|
| 11,634,017 B2 * | 4/2023 | Facchinello | ........... B60J 7/1607 296/100.09 |
| 11,718,166 B2 * | 8/2023 | Dylewski | ................ B60J 7/141 296/100.07 |
| 11,724,582 B2 * | 8/2023 | Dylewski | .............. B60J 7/1607 296/100.07 |
| 2021/0053427 A1 * | 2/2021 | Gu | ........................... B60J 10/32 |
| 2021/0061078 A1 * | 3/2021 | Cai | .......................... B60J 7/198 |
| 2021/0379970 A1 * | 12/2021 | He | ........................... B60J 10/27 |
| 2023/0398846 A1 * | 12/2023 | Qiu | .......................... B60J 7/141 |
| 2025/0050718 A1 * | 2/2025 | Dylewski | .............. B60J 7/1607 |

* cited by examiner

*Primary Examiner* — Jason S Daniels

(57)                ABSTRACT

The invention relates to a waterproof vehicle cover including a large front bar system, a large rotating shaft system, a small rotating shaft system, a rear bar system, a side rail system, a clamp system, a support bar system, a front bar fixing system and a lock bolt system.

6 Claims, 13 Drawing Sheets

WATERPROOF VEHICLE COVER

TECHNICAL FIELD

This invention is relevant to automobile accessories, especially a waterproof vehicle cover.

BACKGROUND TECHNOLOGY

The cargo hopper of a pickup truck (also known as a sedan truck) is used to haul goods. Since the cargo hopper of the pickup truck is open, in order to avoid the rain from wetting the goods inside the cargo hopper in rainy and snowy weather, a rear car cover is invented and installed on the cargo hopper of the pickup truck to cover the goods inside to prevent the goods in the cargo hopper from being wet by rain.

The current cover structure is described below, with a number of reversible cover plates on a frame using hinges and other structures, but the cover plates are mostly above the cover and have a poor appearance to match the body of the car.

ABOUT THE INVENTION

The purpose of the present invention is to provide a waterproof vehicle cover, which, through improvements to the structure of the cover (including improvements to the plate body and improvements to the connection between the plate covers), results in a more consistent cover and a better matching of the pockets.

In order to solve the above-mentioned problems, the technical solution adopted in the present invention is as follows:

A waterproof vehicle cover, wherein, includes a large front bar system, a large rotating shaft system, a small rotating shaft system, a rear bar system, a side rail system, a clamp system, a support bar system, a front bar fixing system and a lock bolt system.

The large front bar system, the large rotating shaft system, the small rotating shaft system and the rear bar system are formed as transverse frame fixing cover plates, the cover plates are used to connect the large front bar system and the large rotating shaft system, the large rotating shaft system and the small rotating shaft system, the small rotating shaft system and the rear bar system.

The side rail system is a longitudinal frame, which together with the transverse frame forms the skeleton of the car cover, The lock bolt system is used to lock the large rotating shaft system, the small rotating shaft system and the rear bar system to the side rail system respectively.

The front bar fixing system connects the large front bar system to the vehicle cargo hopper.

The support bar system is connected to the side rail system.

The clamp system is used to connect the side rail system to the cargo hopper.

Further, the large front bar system includes a large front bar, a rubber strip, a small intermediate bar, a insert buckle base, a front bar rubber strip and a spacer. the insert buckle base is fixed to the large front bar, the spacer is fixed to the insert buckle base, a front bar rubber strip socket is arranged on the large front bar for holding the front bar rubber strip. A front bar groove is arranged on the large front bar to fix the front bar fixing system. The front bar fixing system includes a plastic cap, a plum nut, a front bar fixing block, a front bar slider and a T-shaped rod, the front bar slider is fixed in the front bar groove, the front bar slider is provided with a fixing claw for fixing the T-shaped rod, the T-shaped rod is fixed to the front bar fixing block through a plum nut after passing through the waist hole in the front bar fixing block. The plastic cap is fixed to the end of the T-shaped rod, the T-shaped rod is snapped into the front bar slider through a inverted groove.

Further, the large rotating shaft system includes a large intermediate rotating shaft bar, a rotating shaft rubber strip, a large intermediate bar and a small intermediate bar, between the large intermediate rotating shaft bar and the large intermediate bar, between the large intermediate rotating shaft bar and the small intermediate bar are both connected through a rotating shaft rubber strip, the large intermediate bar is connected to a cover plate, the small intermediate bar is connected to a cover plate, the large intermediate bar and the small intermediate bar are connected to the large intermediate rotating shaft bar respectively through the rotating shaft rubber strip. Since the large rotating shaft system needs to be rotated to achieve the folding of the car cover, three intermediate bars are used for the connection, allowing for a smaller gap between them and no sinking of the rubber strips after a long-term use. Similarly, the small rotating shaft system includes a large intermediate bar, rubber strips and a small intermediate bar. The large intermediate bar and the small intermediate bar are connected to each other through a rotating shafting rubber strip.

Further, the lock bolt system includes a lock sleeve, a lock bolt, a spring, a first pinch section, a puller, a second pinch section and a connecting plate. The lock sleeve is connected to the rotating shaft system, the lock bolt and first pinch section are connected through a puller, the puller passes through the lock sleeve, the lock bolt and first pinch section are located at each end of the lock sleeve, the lock bolt is attached to the lock sleeve through a spring, the connecting plate is connected to the rotating shaft system, the connecting plate is connected with the second pinch section, the puller passes through the connecting plate and slides along the connecting plate. By providing the first and second pinch section, it is more convenient for users to exert force while using.

Further, the clamp system includes a left clamp and a right clamp, the left clamp and right clamp are bolted together, the left clamp includes a left clamp head at the upper end and a left base plate at the lower end, the middle part of the left clamp is connected with a limit plate, the limit plate forms a "C" shape structure together with the left clamp for limiting the nut and preventing rotation of the nut. The right clamp includes a right clamp head at the upper end and a right base plate at the lower end, the right clamp head cooperates with the left clamp head to clamp the side rail to the cargo hopper.

Further, the support bar system includes a guide rail buckle, a support slider, a screw, a slider knob, a support bar and a support base, one end of the support bar is embedded on the support base, the other end of the support bar is embedded on a slider knob on the support slider, the support bar is clamped on the guide rail buckle on the side rail, the screw is fixed to the support slider, the support slider is connected to the guide rail through a screw, the support slider is provided with a slider knob, the support base is connected to the cover plate, one end of the support bar is hinged to the slider knob, the other end of the support bar is detachably connected to the support base, the guide rail buckle is slidingly connected to the guide rail, one end of the support bar is connected to the guide rail through the support slider, when it is required, clamp the other end of the support bar with the support base of the cover plate to support the plate, when the support bar is not needed, clamp the other end of the support bar with the guide rail buckle to retract the support bar, connect the support bar to the guide rail, and there is no need to adjust the support bar when replacing the plate.

Further, the side rail system includes a side rail guide rail, a side rail rubber strip, a side rail profile and a side rail joint, the side rail joints are provided with side rail joint insertion slots, which are connected with the side rail profile insertion slot on the side rail profile to form a through slot, the side rail rubber strips are inserted into the formed through slot. The inserted portion on the side rail rubber strip is extended into the through slot, the side rail joint is matched with the rotating shaft system and the side rail profile is matched with the plate, since the cover plate needs to be folded by rotating, the setting of three side rail joints enables the gap between the side rail profile and the joint to be sufficiently small, as the side rail system needs to connect with the side rail rubber strip at the top after the connection has been made, when the gap between the side rail joint and the side rail profile is small enough, the side rail rubber strip will not sink, thus extending the service life of the side rail rubber strip.

The beneficial effect of the invention is that the invention forms a sealed car cover with the large front bar, the rotating shaft system, the rear bar system and the side rail joint, which does not leak and has a high aesthetic appearance and almost flat body.

In the picture: 1—Large front bar system; 11—Inserted buckle base; 12—Spacers; 2—Large Rotating shaft system; 21—Large intermediate bar; 22—Large intermediate rotating shaft bar; 23—Small intermediate bar; 24—Rotating shaft rubber strips; 3—Small rotating shaft system; 4—Rear bar system; 5—Side rail system; 501—Side rail guide rail; 502—Side rail rubber strip; 503—Side rail profile; 504— Side rail joint; 6—Clamp system. 601—Left clamp; 602— Right clamp; 603—Connection bolt; 6011—Left clamp head; 6012—Limit plate; 6013—Left base plate; 6021— Right clamp head; 6022—Right base plate; 7—Support bar system; 701—Guide rail buckle; 702—Support slider; 703—Screw; 704—Slider knob; 705—Support bar; 706—

Support base; 8—Front bar fixing system; 801—Plastic cap; 802—Plum nut; 803—Front bar fixing block; 804—Front bar slider; 805—T-shaped rod; 9—Lock bolt system; 91—Lock sleeve; 92—lock bolt; 93—Spring; 94—First pinch section; 95—Puller; 96—Second pinch section; 97—Connecting plate.

THE CONCRETE METHOD TO CARRY OUT

The following instruction further explains the invention's concrete implementation method. In order to enable a clearer understanding of the objects mentioned above, features and advantages of the present invention, the invention is described in detail below in connection with the accompanying drawings and specific embodiments. It should be noted that the embodiments of the present application and the features in the embodiments can be combined without conflict.

The terms "first", "second", "third", etc. are only used to differentiate the description and should not be construed as indicating or implying relative importance.

In the description of the invention, it should also be noted that, unless otherwise expressly specified and limited, the terms "arranged," "installed," "connected," and "combined" should be understood in a broad sense. for example, it may be a fixing connection, it can also be a detachable connection or an integral connection. it can be a mechanical connection or an electrical connection. it can be a direct connection or an indirect connection through an intermediate media, and it can be internal connection within two assemblies. For those of ordinary skill in this field, specific meanings of the above terms in the present invention can be understood in specific situations.

The specific embodiments of the present invention will be described in detail below in connection with the accompanying drawings. It should be understood that the specific embodiments described herein are intended only to illustrate and explain the present invention and not to limit it.

Embodiment 1

Figure 1:
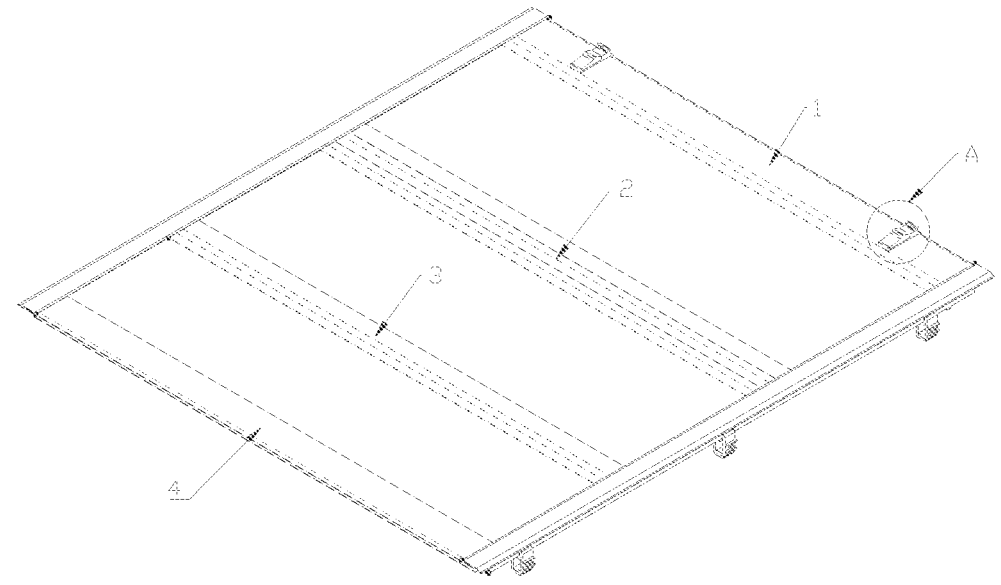
FIG. 1 is the structure schematic diagram 1 of the present invention.

As shown in FIGS. 1, a waterproof vehicle cover includes a large front bar system 1, a large rotating shaft system 2, a small rotating shaft system 3, a rear bar system 4, a side rail system 5, a clamp system 6, a support bar system 7, a front bar fixing system 8 and a lock bolt system 9.

The large front bar system 1, the large rotating shaft system 2, the small rotating shaft system 3 and the rear bar system 4 are formed as transverse frame fixing cover plates, the cover plates are used to connect the large front bar system 1 and the large rotating shaft system 2, the large rotating shaft system 2 and the small rotating shaft system 3, the small rotating shaft system 3 and the rear bar system 4.

The side rail system 5 is a longitudinal frame, which together with the transverse frame forms the skeleton of the car cover, The lock bolt system 9 is used to lock the large rotating shaft system 2, the small rotating shaft system 3 and the rear bar system 4 to the side rail system 5 respectively.

The front bar fixing system 8 connects the large front bar system 1 to the cargo hopper.

The support bar system 7 is connected to the side rail system 5.

The clamp system 6 is used to connect the side rail system 5 to the cargo hopper.

Embodiment 2

Figure 2:
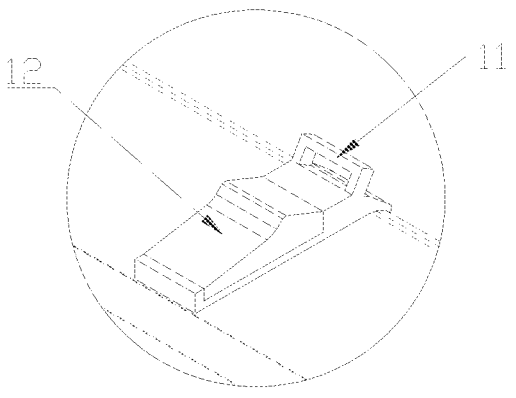
FIG. 2 is the partial enlarged view of part A in FIG. 1.
Figure 3:
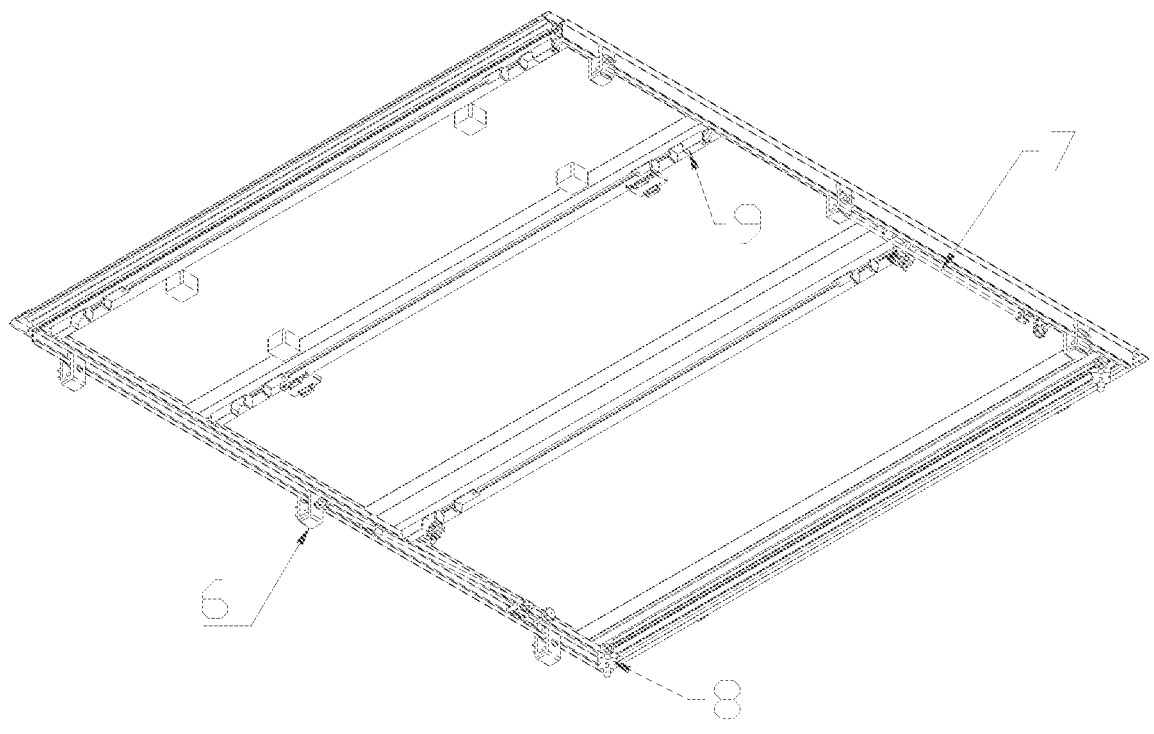
FIG. 3 is the structure schematic diagram 2 of the present invention.
Figure 4:
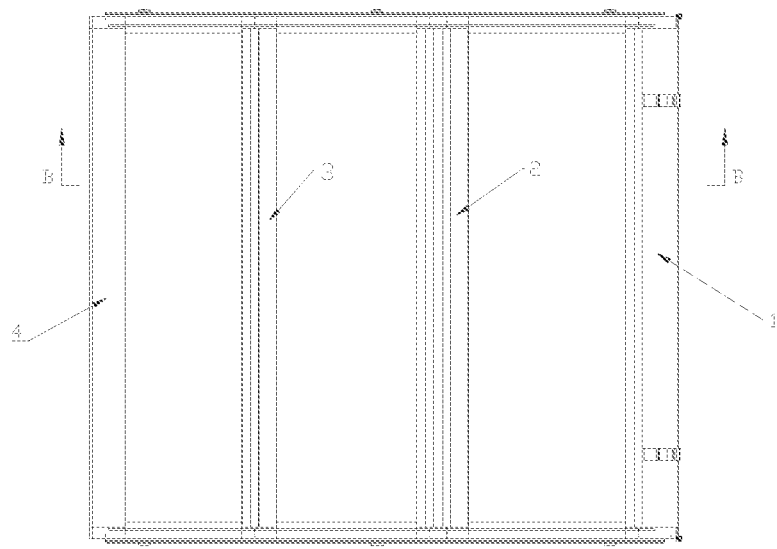
FIG. 4 is the structure schematic diagram 3 of the present invention.
Figure 5:
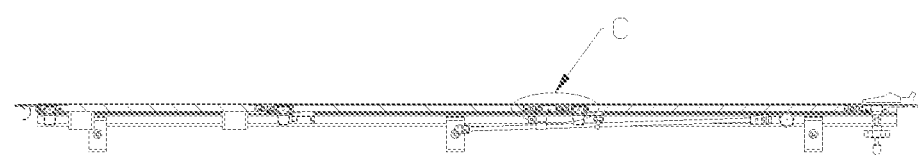
FIG. 5 is the sectional view in the B-B direction in FIG. 4
Figure 6:
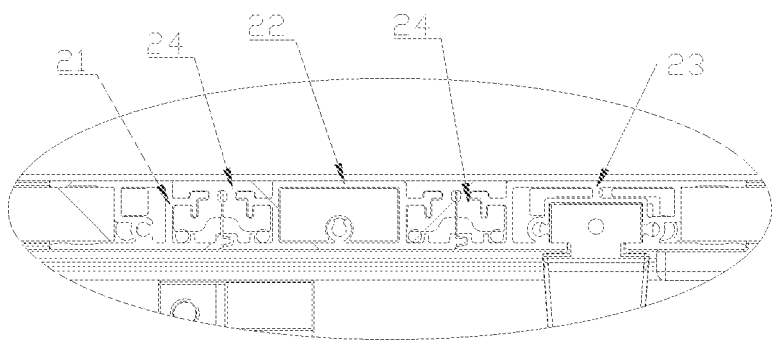
FIG. 6 is the partial enlarged view of part C in FIG. 5.
Figure 13:
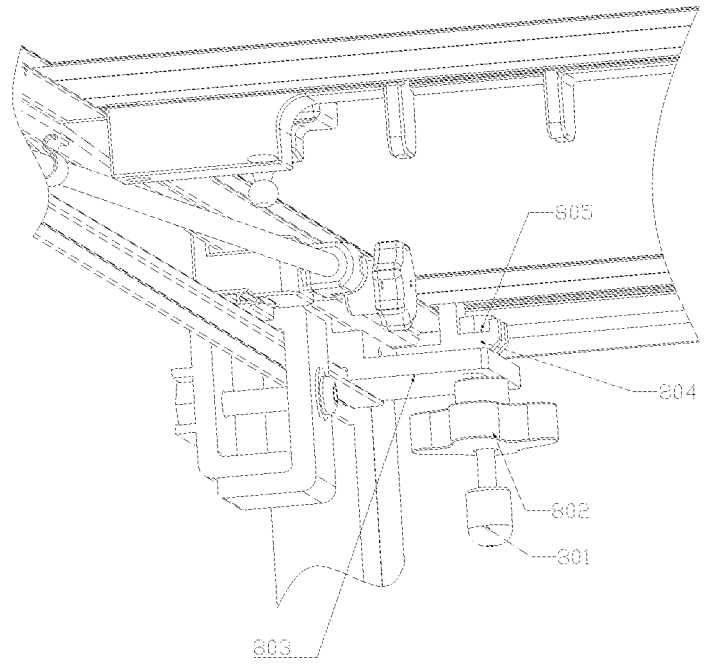
FIG. 13 is the connection schematic diagram of front bar fixing assembly in the present invention.

On the basis of Embodiment 1, as shown in FIGS. 2 and 13, the large front bar system 1 includes a large front bar, a rubber strip, a small intermediate bar 23, a insert buckle base 11, a front bar rubber strip and a spacer 12. The insert buckle base 11 is fixed to the large front bar, the spacer 12 is fixed to the insert buckle base, a front bar rubber strip socket is arranged on the large front bar for holding the front bar rubber strip. A front bar groove is arranged on the large front bar to fix the front bar fixing system 8.

The front bar fixing system 8 includes a plastic cap 801, a plum nut 802, a front bar fixing block 803, a front bar slider 804 and a T-shaped rod 805;

The front bar slider 804 is fixed in the front bar groove, the front bar slider 804 is provided with a fixing claw for fixing the T-shaped rod 805, the T-shaped rod 805 is fixed to the front bar fixing block 803 through the plum nut 802 after passing through the waist hole in the front bar fixing block 803, the plastic cap 801 is fixed to the end of the T-shaped rod 805, the T-shaped rod 805 is snapped into the front bar slider through the inverted groove.

Embodiment 3

On the basis of Embodiment 2, as shown in FIGS. 3 to 6, the large rotating shaft system 2 includes a large intermediate rotating shaft bar 22, a rotating shaft rubber strip 24, a large intermediate bar 21 and a small intermediate bar 23, the large intermediate rotating shaft bar 22 and the large intermediate bar 21, the large intermediate rotating shaft bar 22 and the small intermediate bar 23 are both connected through a rotating shaft rubber strip 24, the large intermediate bar 21 is connected to a cover plate, the small intermediate bar 23 is connected to a cover plate, the large intermediate bar 21 and the small intermediate bar 23 are connected to the large intermediate rotating shaft bar 22 respectively through the rotating shaft rubber strip 24. Since the large rotating shaft system 2 needs to be rotated to achieve the folding of the car cover, three intermediate bars are used for the connection, allowing for a smaller gap between them and no sinking of the rubber strips after a long-term use. Similarly, the small rotating shaft system 3 includes a large intermediate bar 21, a rubber strip and a small intermediate bar 23. The large intermediate bar 21 and the small intermediate bar 23 are connected to each other through a rotating shafting rubber strip 24.

Embodiment 4

Figure 10:
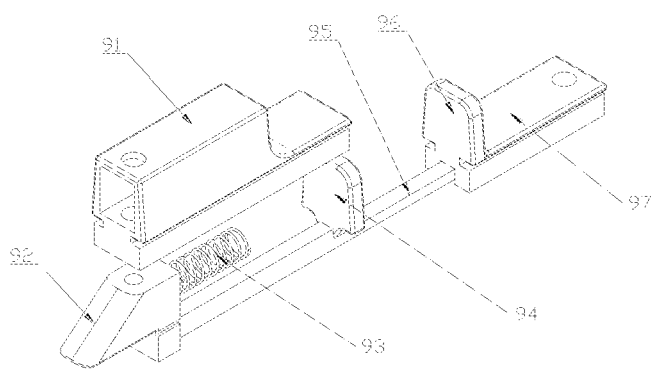
FIG. 10 is the exploded view of the lock system in the present invention.

On the basis of Embodiment 3, as shown in FIGS. 10, the lock bolt system 9 includes a lock sleeve 91, a lock bolt 92, a spring 93, a first pinch section 94, a puller 95, a second pinch section 96 and a connecting plate 97.

The lock sleeve 91 is connected to the rotating shaft system, the lock bolt 92 and first pinch section 94 are connected through a puller 95, the puller 95 passes through the lock sleeve 91, the lock bolt 92 and first pinch section 94 are located at each end of the lock sleeve 91, the lock bolt 92 is attached to the lock sleeve 91 through a spring 93.

The connecting plate 97 is connected to the rotating shaft system, the connecting plate 97 is connected with the second pinch section 96, the puller 95 passes through the connecting plate 97 and slides along the connecting plate 97. By providing the first pinch section 94 and second pinch section 96, it is more convenient for users to exert force while using.

Embodiment 5

Figure 11:
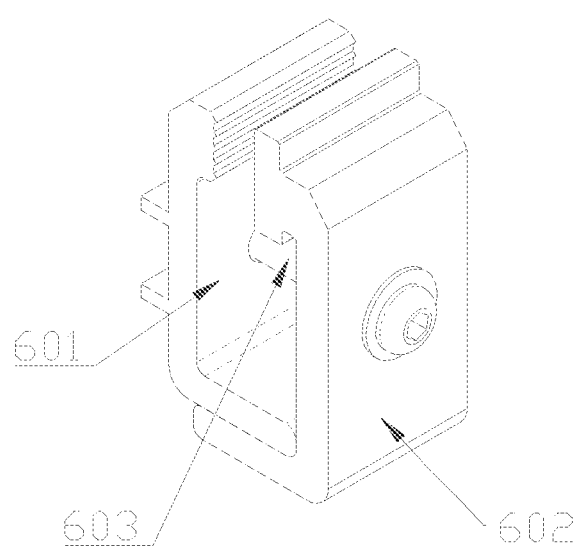
FIG. 11 is the structure schematic diagram 1 of clamp system in the present invention.
Figure 12:
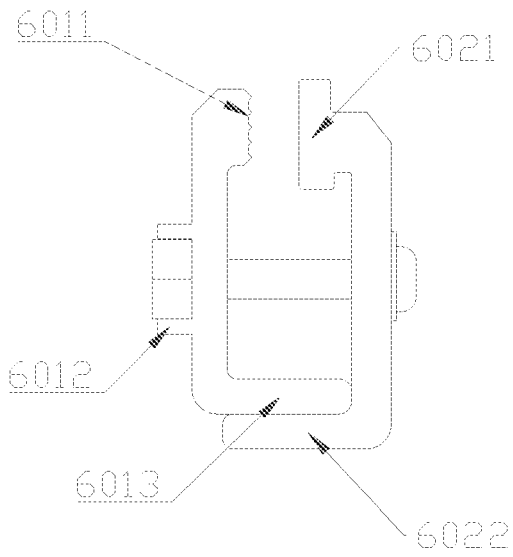
FIG. 12 is the structure schematic diagram 2 of clamp system in the present invention.

On the basis of Embodiment 4, as shown in FIGS. 11 and 12, the clamp system 6 includes a left clamp 601 and a right clamp 602, the left clamp 601 and right clamp 602 are bolted together.

The left clamp 601 includes a left clamp head 6011 at the upper end and a left base plate 6013 at the lower end, the middle part of the left clamp 601 is connected with a limit plate, the limit plate 6012 forms a "C" shape structure together with the left clamp 601 for limiting the nut and preventing rotation of the nut.

The right clamp 602 includes a right clamp head 6021 at the upper end and a right base plate 6022 at the lower end, the right clamp head 6021 cooperates with the left clamp head 6011 to clamp the side rail to the cargo hopper.

Embodiment 6

Figure 7:
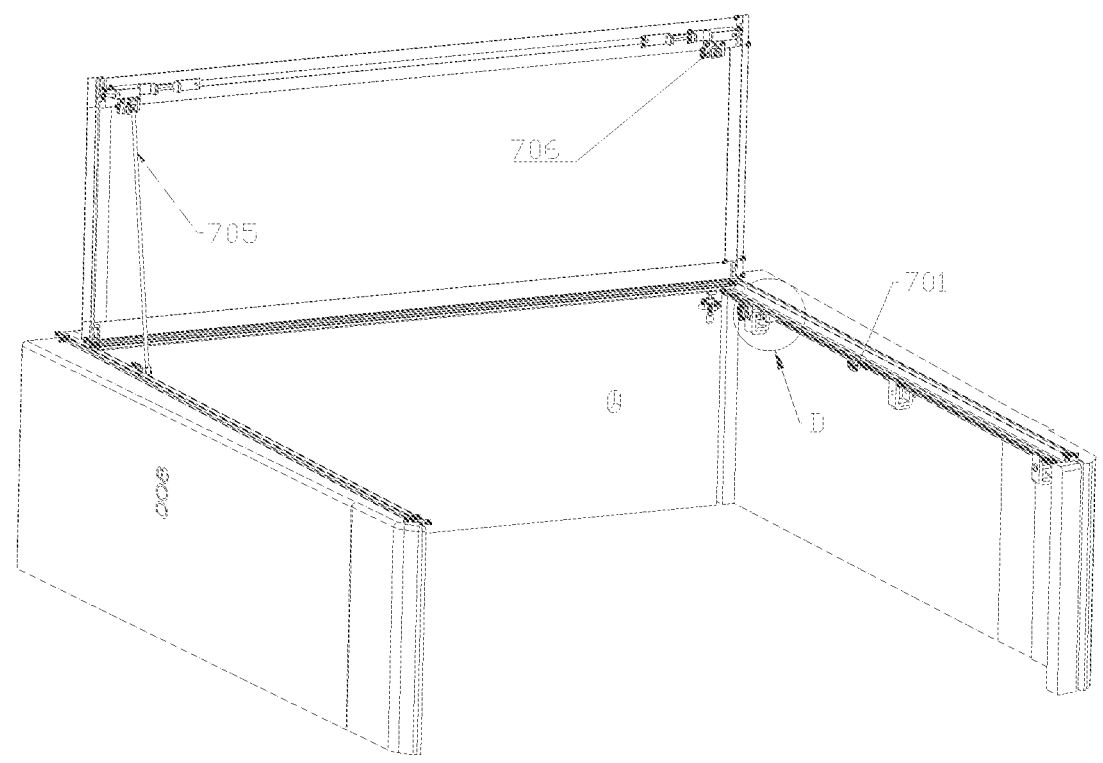
FIG. 7 is use schematic diagram of the present invention.
Figure 8:
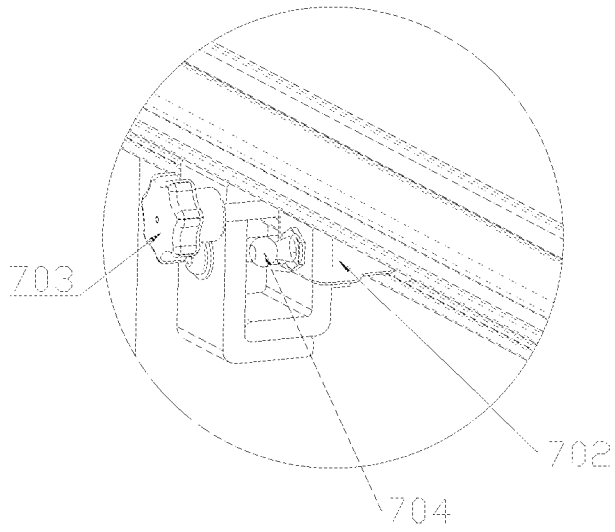
FIG. 8 is the partial enlarged view of part D in FIG. 7.

On the basis of Embodiment 5, as shown in FIGS. 7 and 8, the support bar system 7 includes a guide rail buckle 701, a support slider 702, a screw 703, a slider knob 704, a support bar 705 and a support base 706, one end of the support bar 705 is embedded on the support base 706, the other end of the support bar 705 is embedded on a slider knob 704 on the support slider 702, the support bar 705 is clamped on the guide rail buckle 701 on the side rail guide rail 501, the screw 703 is fixed to the support slider 702, the support slider 702 is connected to the guide rail through a screw 703, the support slider 703 is provided with a slider knob 704, the support base 706 is connected to the cover plate, one end of the support bar 705 is hinged to the slider knob, the other end of the support bar 705 is detachably connected to the support base 706, the guide rail buckle 701 is slidingly connected to the guide rail, one end of the support bar 705 is connected to the guide rail through a support slider 702, when it is required, clamp the other end of the support bar 705 with the support base 706 of the cover plate to support the plate, when the support bar 705 is not needed, clamp the other end of the support bar 705 with the guide rail buckle 701 to retract the support bar 705, connect the support bar 705 to the guide rail, and there is no need to adjust the support bar 705 when replacing the plate.

Embodiment 7

Figure 9:
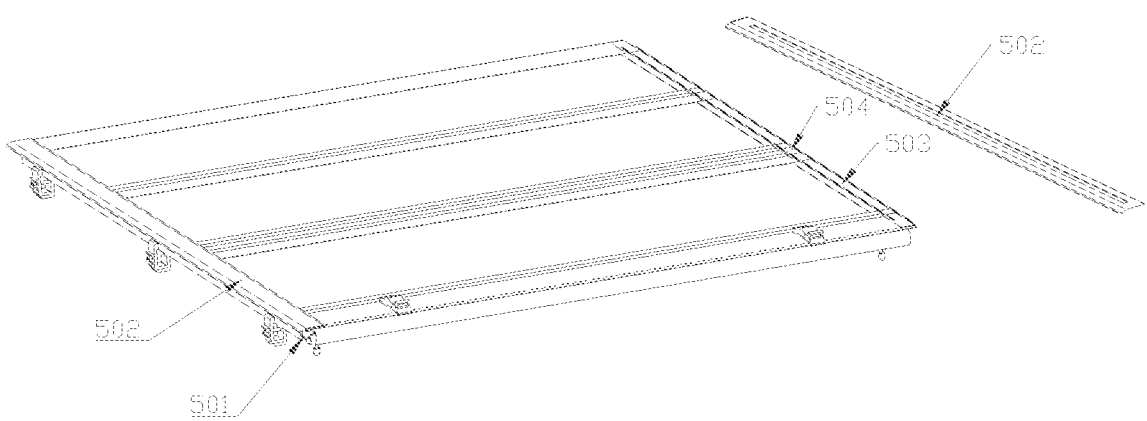
FIG. 9 is the exploded view of the present invention.

On the basis of Embodiment 6, as shown in FIGS. 9, the side rail system 5 includes a side rail guide rail 501, a side rail rubber strip 502, a side rail profile 503 and a side rail joint 504, the side rail joints 504 are provided with side rail joint insertion slots, which are connected with the side rail profile insertion slot on the side rail profile 503 to form a through slot, the side rail rubber strips 502 are inserted into the formed through slot. The inserted portion on the side rail rubber strip 502 is extended into the through slot. The side rail joint 504 is matched with the rotating shaft system and the side rail profile 503 is matched with the plate, since the cover plate needs to be folded by rotating, the setting of three side rail joints 504 enables the gap between the side rail profile 503 and the joint to be sufficiently small, as the side rail system 5 needs to be connected with the side rail rubber strip 502 at the top after the connection has been made, when the gap between the side rail joint 504 and the side rail profile 503 is small enough, the side rail rubber strip 502 will not sink, thus extending the service life of the side rail rubber strip.

The invention is not limited to the above-mentioned optional embodiments, anyone can come up with various other forms of products under the inspiration of the invention, however, regardless of any changes in its shape or structure, all technical solutions that fall within the scope defined by the claims of the present invention shall fall within the scope of protection of the invention.

What is claimed is:

1. A waterproof vehicle cover, comprising a large front rail system (1), a large rotating shaft system (2), a small rotating shaft system (3), a rear rail system (4), a side rail system (5), a clamp system (6), a support rod system (7), a front rail fixing system (8), and a lock bolt system (9), wherein the front rail system (1), the large rotating shaft system (2), the small rotating shaft system (3) and the rear rail system (4) form a transverse frame fixing cover plate, and the front rail system (1) and the large rotating shaft system (2), the large rotating shaft system (2) and the small rotating shaft system (3) and the small rotating shaft system (3) and the rear rail system (4) are all connected with each other by the cover plate;

the side rail system (5) is a longitudinal frame;

the lock bolt system (9) is used to lock the large rotating shaft system (2), the small rotating shaft system (3) and the rear rail system (4) to the side rail system (5) respectively;

the front rail fixing system (8) connects the large front rail system (1) with a vehicle cargo hopper;

the support rod system (7) is connected to the side rail system (5);

the clamp system (6) is used to connect the side rail system (5) with the vehicle cargo hopper;

the front rail system (1) comprises a front rail, a rubber strip, a small intermediate rod (23), a insert buckle base (11), a front rail rubber strip, and a spacer (12);

the insert buckle base (11) is fixed to the front rail, the spacer (12) is fixed to the insert buckle base (11), the front rail is provided with a front rail rubber strip socket for securing the front rail rubber strip;

the large front rail is provided with a front rail sliding groove, and a front rail fixing system (8) is fixed on the front rail sliding groove;

the front rail fixing system (8) comprises a plastic cap (801), a plum nut (802), a front rail fixing block (803), a front rail slider (804), and a T-shaped rod (805);

the front rail slider (804) is fixed inside the front rail sliding groove, the front rail slider (804) is provided with a fixing claw for securing the T-shaped rod (805), and the T-shaped rod (805) passes through a waist hole on the front rail fixing block (803) and is then fixed to the front rail fixing block (803) by the plum nut (802), the plastic cap (801) being fixed to an end of the T-shaped rod (805).

2. The waterproof vehicle cover according to claim 1, wherein, the large rotating shaft system (2) includes a large intermediate rotating shaft bar (22), a rotating shaft rubber strip (24), a large intermediate bar (21) and a small intermediate bar (23), between the large intermediate rotating shaft bar (22) and the large intermediate bar (21), between the large intermediate rotating shaft bar (22) and the small intermediate bar (23) both connected through a rotating shaft rubber strip (24), the large intermediate rod (21) is connected to a cover plate, the small intermediate rod (23) is connected to a cover plate, the large intermediate rod (21) and the small intermediate rod (23) are connected to the large intermediate rod (22) respectively through a rotating shafting rubber strip (24).

3. The waterproof vehicle cover according to claim 1, wherein, the lock bolt system (9) includes a lock sleeve (91), a lock bolt (92), a spring (93), a first pinch section (94), a puller (95), a second pinch section (96) and a connecting plate (97);

the lock sleeve (91) is connected to the rotating shaft system, the lock bolt (92) and the first pinch section (94) are connected through a puller (95), the puller (95) passes through the lock sleeve (91), the lock bolt (92) and the first pinch section (94) are located at each end of the lock sleeve (91), the lock bolt (92) is attached to the lock sleeve (91) through a spring (93);

the connecting plate (97) is connected to the rotating shaft system, the connecting plate (97) is connected with the second pinch section (96), the puller (95) passes through the connecting plate (97) and slides along the connecting plate (97).

4. The waterproof vehicle cover according to claim 1, wherein, the clamp system (6) includes a left clamp (601) and a right clamp (602), the left clamp (601) and right clamp (602) are bolted together;

the left clamp (601) includes a left clamp head (6011) at the upper end and a left base plate (6013) at the lower end, the middle part of the left clamp (601) is connected with a limit plate (6012), the limit plate (6012) forms a "C" shape structure together with the left clamp (601);

the right clamp (602) includes a right clamp head (6021) at the upper end and a right base plate (6022) at the lower end, the right clamp head (6021) cooperates with the left clamp head (6011) to clamp the side rail to the cargo hopper.

5. The waterproof vehicle cover according to claim 4, wherein the support bar system (7) includes a guide rail buckle (701), a support slider (702), a screw (703), a slider knob (704), a support bar (705) and a support base (706);

one end of the support bar (705) is embedded on the support base (706), the other end of the support bar (705) is embedded on the slider knob (704) on the support slider (702).

6. The waterproof vehicle cover according to claim 5, wherein the screw (703) is fixed to the support slider (702), the support slider (702) is connected to the guide rails through the screw (703), the support slider (702) is provided with a slider knob (704), the support base (706) is connected to the cover plate;

one end of the support bar (705) is hinged to the slider knob (704), the other end of the support bar (705) is detachably connected to the support base (706), the guide rail buckle (701) is slidingly connected to the guide rail.

* * * * *